United States Patent
Yao et al.

(10) Patent No.: US 12,488,421 B2
(45) Date of Patent: Dec. 2, 2025

(54) DEPTH ESTIMATION BASED ON DATA FUSION OF IMAGE SENSOR AND DEPTH SENSOR FRAMES

(71) Applicant: Black Sesame Technologies Inc., San Jose, CA (US)

(72) Inventors: Jiaoyang Yao, Singapore (SG); Fangwen Tu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 281 days.

(21) Appl. No.: 17/475,031

(22) Filed: Sep. 14, 2021

(65) Prior Publication Data
US 2023/0083014 A1    Mar. 16, 2023

(51) Int. Cl.
*G06T 5/50*    (2006.01)

(52) U.S. Cl.
CPC ...... *G06T 5/50* (2013.01); *G06T 2207/20182* (2013.01); *G06T 2207/20221* (2013.01)

(58) Field of Classification Search
CPC ............. G06T 5/50; G06T 2207/20182; G06T 2207/20221; G06T 7/50; G06T 2207/10024; G06T 2207/20032; G06T 2207/20036; G06T 2207/20081; G06T 2207/20084; G06T 7/55; G06T 3/4053; G06T 5/002; G06T 2207/10028
USPC ....................................................... 382/254
See application file for complete search history.

(56) References Cited

U.S. PATENT DOCUMENTS

| | | | |
|---|---|---|---|
| 9,137,512 B2 | 9/2015 | Baik et al. | |
| 9,750,399 B2 | 9/2017 | Popovic | |
| 10,353,271 B2 | 7/2019 | Wang et al. | |
| 11,989,897 B2* | 5/2024 | Zhou | G06T 5/50 |
| 2014/0192281 A1* | 7/2014 | Smithwick | G02B 30/52 |
| | | | 345/426 |
| 2021/0144357 A1* | 5/2021 | Kim | H04N 13/271 |
| 2021/0183083 A1* | 6/2021 | Yan | G06N 3/045 |
| 2021/0319569 A1* | 10/2021 | Peri | G06V 10/44 |
| 2021/0366139 A1* | 11/2021 | Kim | G06T 7/529 |
| 2021/0398313 A1* | 12/2021 | Lemley | G06V 40/176 |
| 2022/0020112 A1* | 1/2022 | Wen | G06T 9/00 |
| 2022/0067950 A1* | 3/2022 | Lv | G06N 3/045 |
| 2022/0148207 A1* | 5/2022 | Varekamp | G06T 5/50 |
| 2022/0198693 A1* | 6/2022 | Li | G06T 7/70 |
| 2022/0358359 A1* | 11/2022 | Huang | G06N 3/08 |
| 2022/0406013 A1* | 12/2022 | Xiong | G06T 5/73 |

(Continued)

FOREIGN PATENT DOCUMENTS

| | | | |
|---|---|---|---|
| EP | 3757890 A1 * | 12/2020 | G06K 9/00 |
| WO | WO-2021259287 A1 * | 12/2021 | G06T 7/55 |
| WO | WO-2022000266 A1 * | 1/2022 | |

*Primary Examiner* — Jennifer Mehmood
*Assistant Examiner* — Pardis Sohraby
(74) *Attorney, Agent, or Firm* — Timothy T. Wang; Ni, Wang & Massand, PLLC

(57) ABSTRACT

A method of depth estimation, including, receiving an image frame, determining a relative depth map based on the image frame, receiving a sparse depth frame, preprocessing the sparse depth frame, determining a scale-adjusted relative depth map based on the relative depth map and the preprocessed sparse depth frame and fusing the relative depth map and the scale-adjusted relative depth map to produce an absolute depth map.

10 Claims, 10 Drawing Sheets

(56) References Cited

U.S. PATENT DOCUMENTS

2023/0252661 A1\* 8/2023 Zhu .................... H04N 13/239
　　　　　　　　　　　　　　　　　　　382/100

\* cited by examiner

DEPTH ESTIMATION BASED ON DATA FUSION OF IMAGE SENSOR AND DEPTH SENSOR FRAMES

BACKGROUND

Technical Field

The instant disclosure is related to image depth correction more specifically to depth estimation based on the fusion of data of image sensor and depth sensor frames.

Background

Current solutions utilize one type of sensor for determining depth mapping for photo effect rendering. The use of one type of sensor may lead to scale ambiguity, sparse depth information, limited depth range and other possible issues. The drawback of using one type of sensor may depend on which type of sensor is used. If only a Red Blue Green (RGB) camera sensor is used depth value scale ambiguity may result. If a Time-of-Flight (TOE) sensor alone is used, this may cause incomplete depth information, limited range and limited field of view (FOV).

SUMMARY

An example method of depth estimation includes, receiving an image frame, determining a relative depth map based on the image frame, receiving a sparse depth frame, preprocessing the sparse depth frame, determining a scale-adjusted relative depth map based on the relative depth map and the preprocessed sparse depth frame and fusing the relative depth map and the scale-adjusted relative depth map to produce an absolute depth map.

Another example method of depth estimation includes, receiving an image frame, determining a relative depth map based on the image frame, receiving a sparse depth frame, preprocessing the sparse depth frame, determining a sparse depth map based on the preprocessed sparse depth frame and fusing the relative depth map and the sparse depth map to produce an absolute depth map.

A further example method of depth estimation includes, receiving an image frame, determining a relative depth map based on the image frame, receiving a sparse depth frame, preprocessing the sparse depth frame, determining a sparse depth map based on the preprocessed sparse depth frame, determining a scale-adjusted relative depth map based on the relative depth map and the sparse depth map and fusing the relative depth map and the scale-adjusted relative depth map to produce an absolute depth map.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
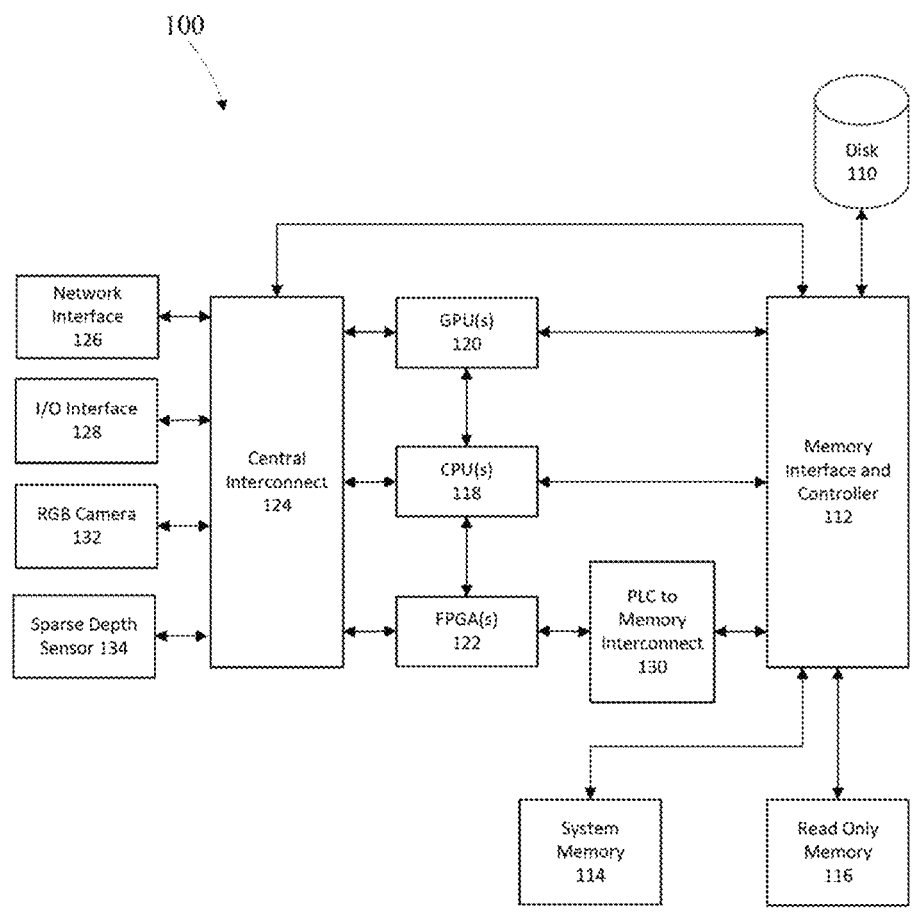
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128, the network interface 126 a red-blue-green camera 132 and a sparse depth sensor 134.

Figure 2:
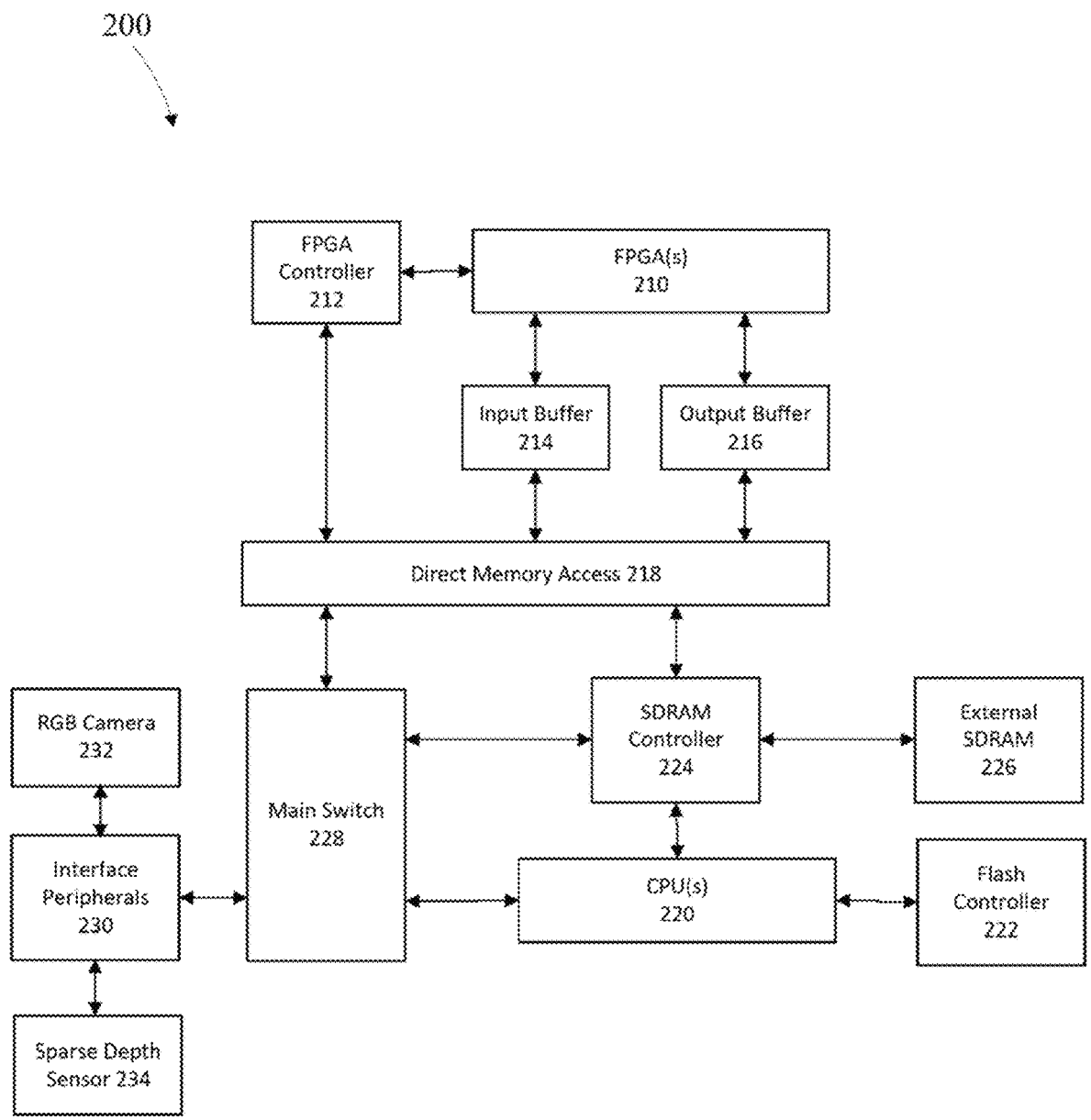
FIG. 2 is an example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230, a red-blue-green camera 232 and sparse depth sensor 234 are also connected to the peripherals interface 230. A flash controller 222 controls persistent memory and is connected to the CPU 220.

Depth sensors may be used in applications such as facial authentication and three dimensional reconstructions. Time-of-flight and other sparse distance measurement sensors may be used in auto focus, soft out-of-focus backgrounds and augmented reality and virtual reality applications.

Current depth mapping utilizes one type of sensor; the proposed solution utilizes information from two types of sensors, an image sensor and a sparse depth sensor. By feeding these two information sources into a fusion network, a high-resolution dense depth map may be found having reduced occlusions and scale uncertainty.

Depth information inferred from an image frame may suffer scale ambiguity problems, which may be implicit with monocular depth estimation from the monocular depth estimation module. The proposed sensor fusion method may overcome this issue.

A possible solution includes a depth map estimation system that utilizes a digital image camera such as red-blue-green (RGB) camera and an additional sparse depth sensor for visual effects rendering as shown in FIGS. 1 and 2. The image data of the digital image camera is provided by an image sensor in the form of an image frame. The sparse depth data is provided by a sparse depth sensor such as a time-of-flight, light detection and ranging, structured light and the like in the form of a sparse depth frame.

One example solution utilizes deep learning for depth refinement that may include noise reduction, field of view extension, occlusion filling and resolution enhancement. The example solution includes multi-stage depth prediction to generate a high-resolution depth map that may increase generalization and noise tolerance capability.

The solution may utilize a light neural network to reduce the computation burden. The multi-stage loss design may output a relative depth and an absolute depth in a generalized manner adaptable to multiple environments. The data from the image sensor and the depth sensor are fed into a fusion network to generate a high-resolution absolute depth map.

The sparse depth sensor provides a scale and a displacement pattern so that a relative depth map may be remapped via a scale-adjusted relative depth map to an absolute depth map. By depth remapping via the scale-adjusted relative depth map and fusion, a dense depth map may be determined. The relative depth may be updated using image sensor data to ensure generalization ability, while the absolute depth module may be dynamically changed to fit a specific environment or sensor type.

An example solution provides a low-complexity depth map prediction which involves a digital image sensor, a sparse depth sensor and a monocular depth estimation module. Although the sensors may be different with respect to various performance parameters such as field of view, resolution and detection distance, the proposed solution fuses the information to determine a high-resolution dense depth map.

One proposed depth estimation network utilizes a lightweight encoder-decoder design to reduce computation complexity. A multi-stage loss design may allow for generalization in depth estimation. The method may be deployed on consumer mobile devices having reduced computational resources and utilizing inexpensive sensors.

Figure 3:
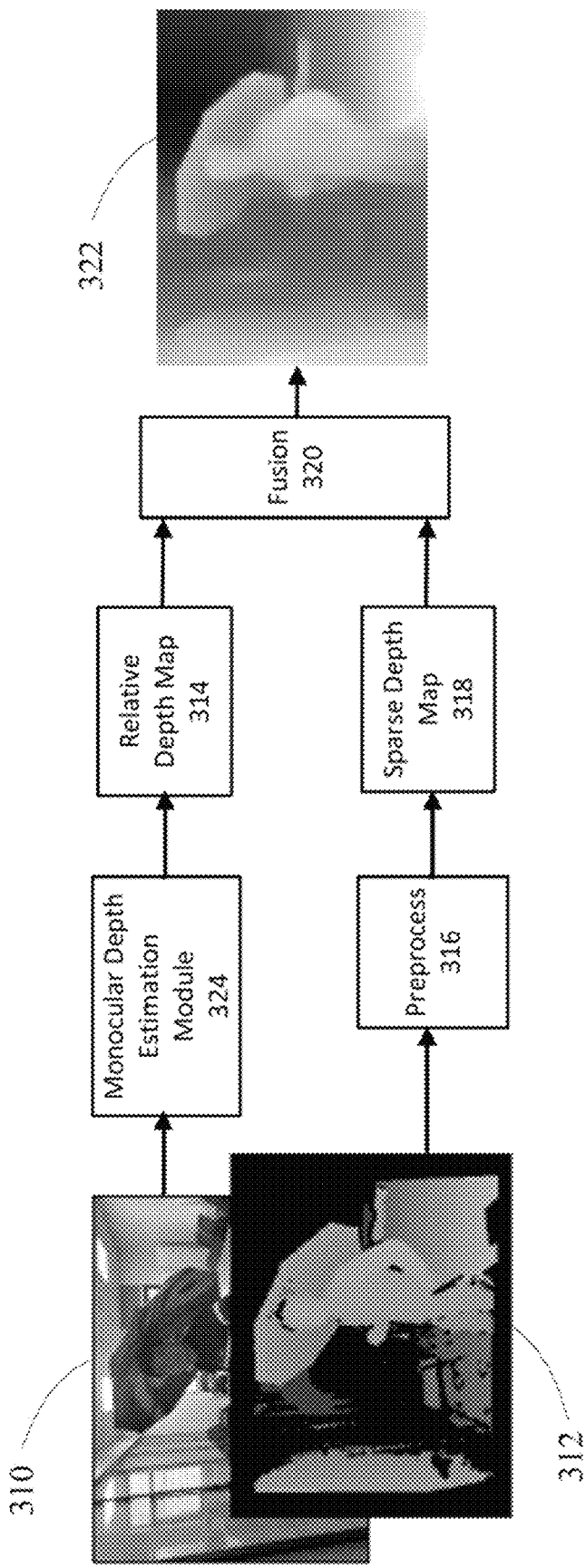
FIG. 3 is a first example flow of depth estimation in accordance with one embodiment of the disclosure.

FIG. 3 depicts an example flow of depth estimation. The flow receives an image frame 310 of data from the image sensor and a sparse depth frame 312 from the sparse depth sensor. The image frame is input into a monocular depth estimation module 324 to determine a relative depth map 314, this relative depth map may suffer from scale ambiguity. The relative depth map module may include an encoder and decoder. The sparse depth frame is input into a preprocess module 316 which filters the sparse depth frame, this preprocess module may include noise reduction, hole reduction, median filtering and occlusion reduction. The output of the preprocess module may be a sparse depth map 318. The relative depth map 314 and the sparse depth map 318 may be input into a fusion module 320 which outputs an absolute depth map 322 that has had correction of the scale ambiguity from the relative depth determined via the image sensor.

Inexpensive depth sensors offer low quality depth output with low resolution, small field of view, and noisy depth values. An example system utilizes multiple modules to optimize the depth results. The modules include field of view extension module, noise reduction module and resolution enhancement modules. After processing, the field of view of sparse depth frame may be extended to the field of view of the image frame. Noise of the input depth may be suppressed and the resolution of sparse depth map may be enhanced.

Before sending depth information into the fusion module, a preprocess module filters the sensor data, thus reducing noise and defects. The sparse depth noise or holes may be reduced by open/close operations and median filtering, while regional defects may be reduced by super-pixel filtering. A median filter considers each pixel in an image region to determine whether or not the pixel value is representative of the region, if the pixel value is not representative of the region the filter replaces the pixel value with the median of those values within the region. A super-pixel is larger than a normal pixel and is rendered in the same color and brightness and creates groups of similar looking pixels. Super-pixel filtering segment an image into regions based on similarity measures to obtain regions that represent regions with far less data than when using all the pixels in an image frame.

Figure 4:
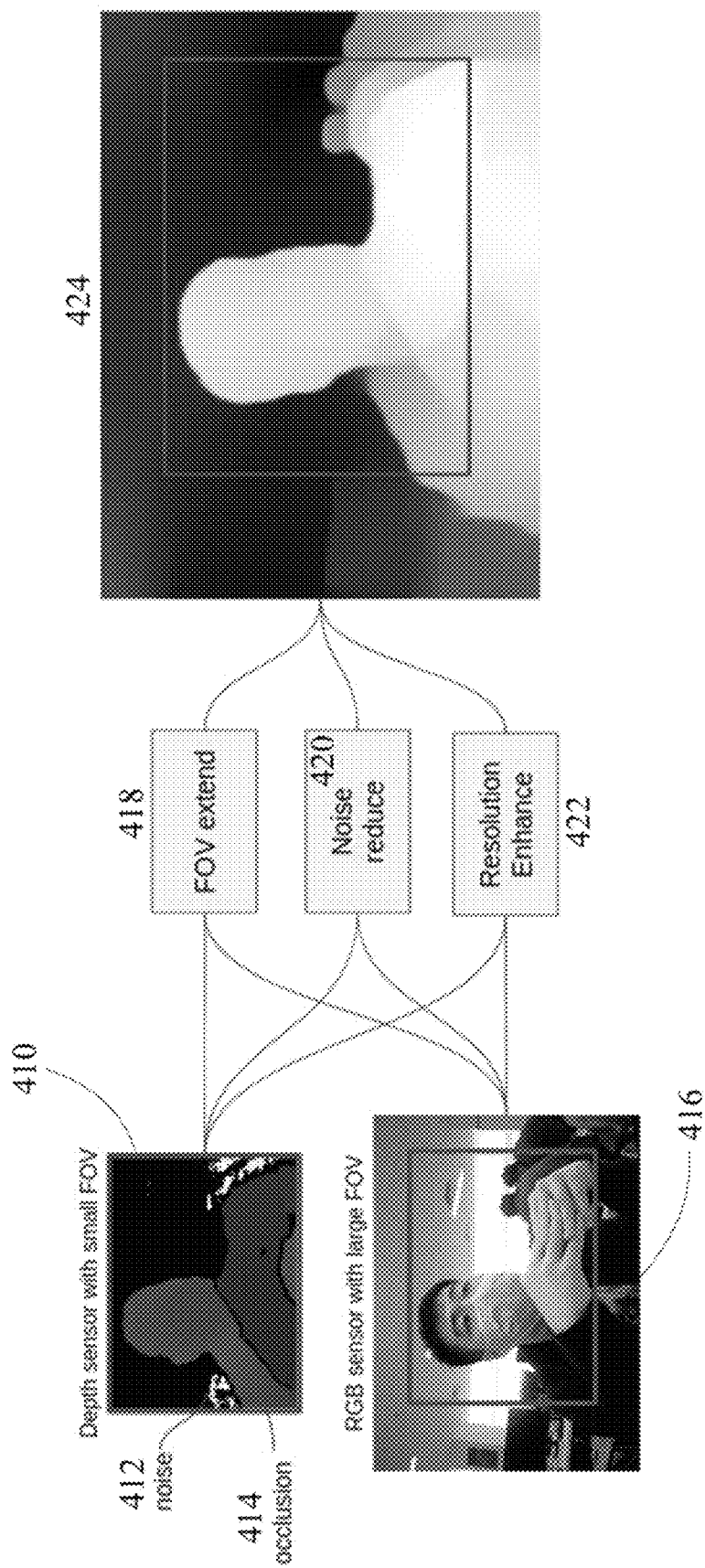
FIG. 4 is an example sensor data flow in depth estimation in accordance with one embodiment of the disclosure.

FIG. 4 depicts an example sensor data flow in depth estimation. A sparse depth frame 410 has a small field of view and includes noise 412 and occlusions 414. An image frame 416 has a large field of view which is different from the small field of view of the sparse depth frame. The sparse depth frame 410 and the image frame 416 are processed to match the field of views 418, reduce noise 420 and enhance image resolution 422 to yield a sparse depth map 424.

In the training phase, augmentation may be applied to simulate defects based on a specific environmental and sensor types. The simulated defects may include distance limitations, measurement errors, unavailable regions, machine noise patterns and the like. While in the testing phase, the depth data from the sparse depth sensor may be preprocessed prior to reception by the fusion network, the preprocessed sparse depth frame yields a sparse depth map. The preprocessing may include filtering, de-noising and alignment.

Currently, depth sensor fusion methods are typically either optimization based or deep learning based. Optimizations like conditional random field (CRF) have difficulty isolating universally applicable parameters, and typically utilize extensive computation resources. Deep learning networks suffer from training and readjustment issues.

Figure 5:
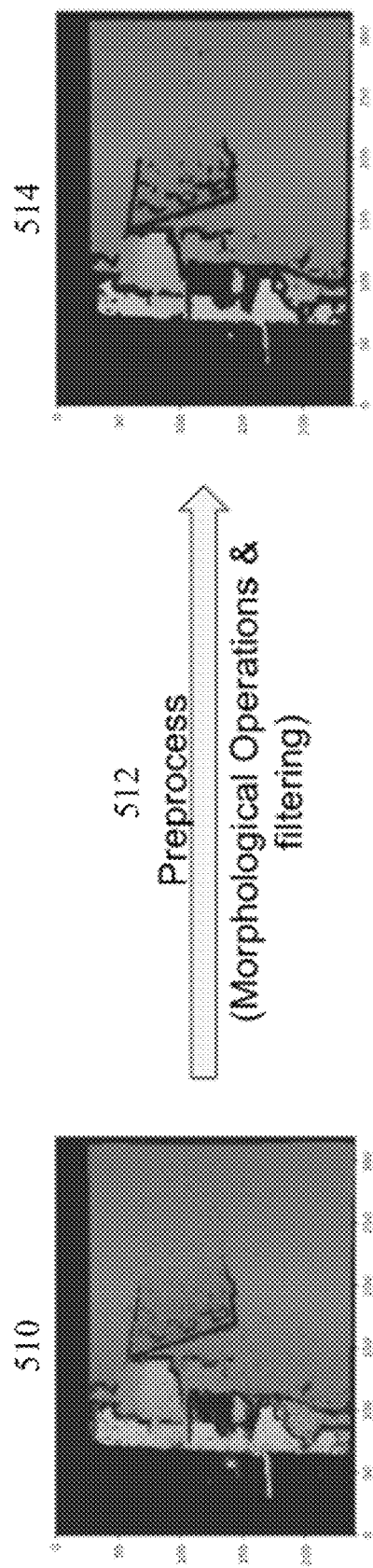
FIG. 5 is an example of preprocessing of a sparse depth frame in accordance with one embodiment of the disclosure.

FIG. 5 depicts an example of preprocessing of a sparse depth frame. The original sparse depth map 510, in this instance a time-of-flight measurement is preprocessed 512 to perform morphological and filtering operations, yielding a de-noised time-of-flight sparse depth map 514.

The proposed depth prediction structure utilizes a multi-stage design to produce two depth estimations, a predicted relative depth and a predicted sparse depth, may yield a scale-adjusted relative depth map. An inputted image frame is input to predict a relative depth map, which is later delivered with sparse depth sensor information and may utilize the scale-adjusted relative depth map to predict an absolute depth map.

Figure 6:
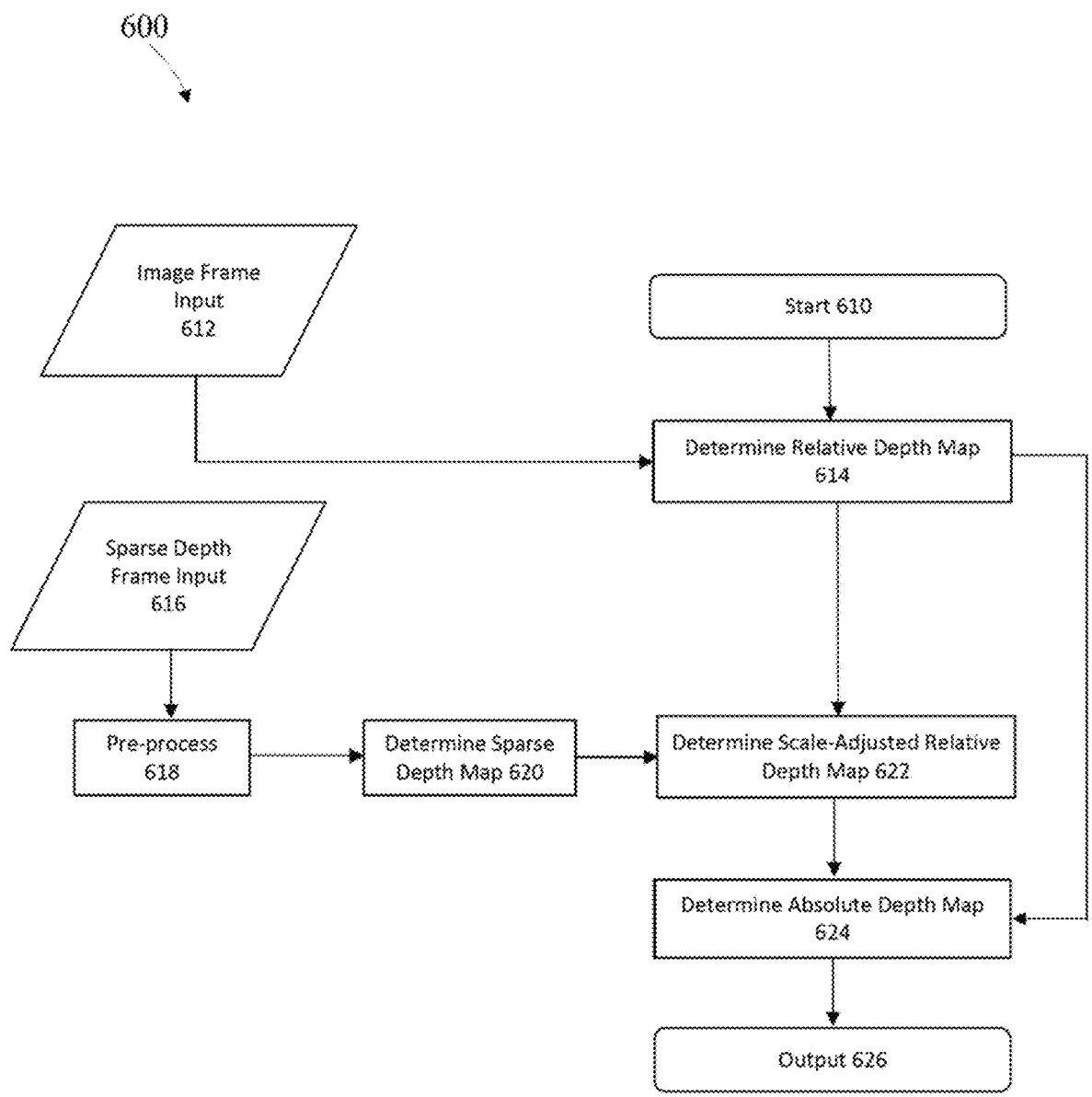
FIG. 6 is another example of depth estimation in accordance with one embodiment of the disclosure.

FIG. 6 depicts an example flowchart of depth estimation. The example flow starts with initiation 610 and receives an image frame 612 to a relative depth map module that determines a relative depth map 614. The sparse depth sensor input 616 is preprocessed 618 to de-noise and filter the input and yields a sparse depth map 620 which is sent to a scale-adjusted relative depth map module to determine 622 a scale-adjusted relative depth map. The relative depth map and the scale-adjusted relative depth map are input into a fusion module to determine 624 an absolute depth map which is output 626.

Figure 7:
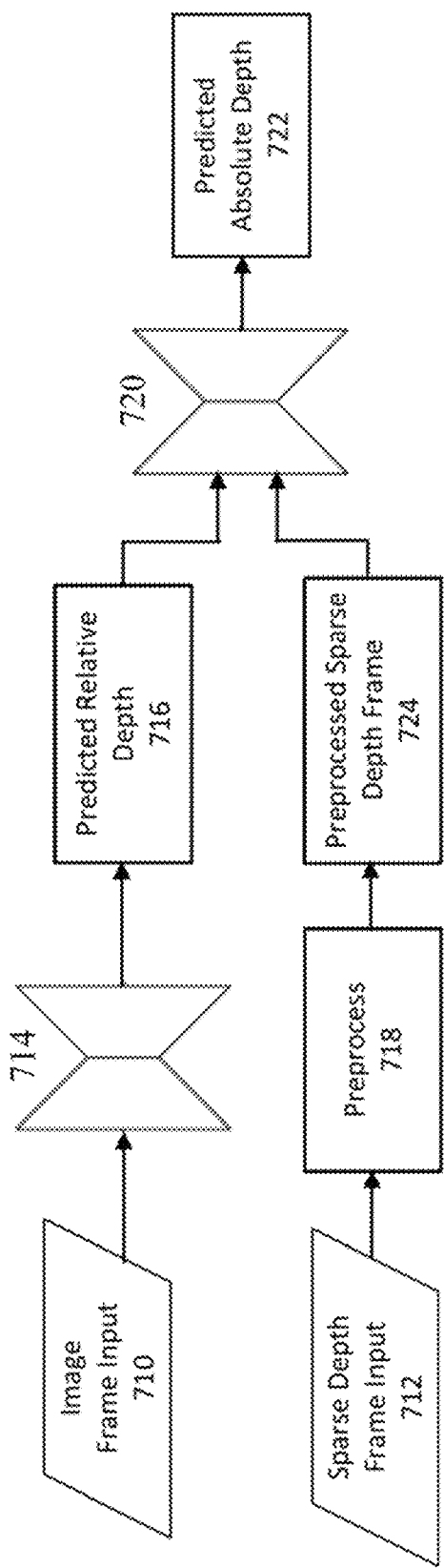
FIG. 7 is an example network schematic for depth estimation in accordance with one embodiment of the disclosure.

FIG. 7 depicts an example network schematic for depth estimation. An image frame is input 710 into an encoder-decoder network 714 to output a predicted relative depth map 716. A sparse depth sensor frame input 712 is preprocessed 718 and the output of the preprocessing yields a preprocessed sparse depth frame 724 which is input with a predicted relative depth map 716 into an encoder-decoder network 720 to produce a predicted absolute depth map 722.

Figure 8:
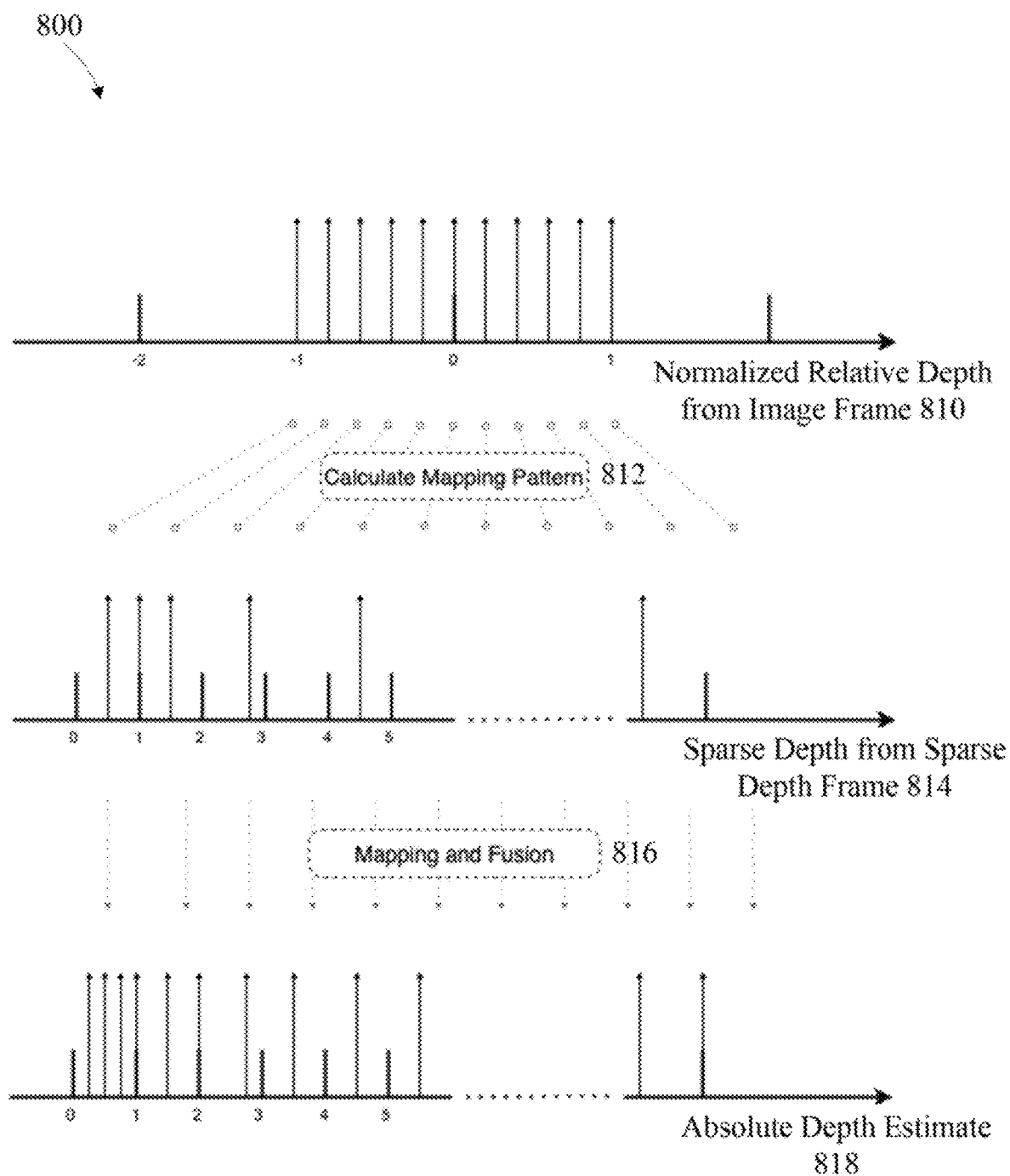
FIG. 8 is an example depth mapping for depth estimation in accordance with one embodiment of the disclosure.

FIG. 8 depicts an example depth mapping. A relative depth map is predicted to determine a relative distance relationship between individual regions of the image frame. Since the absolute value of relative depth map does not reflect the true distance, the values can be normalized to [−1, 1]. A normalized relative depth estimate 810 may be predicted based on the image frame and a mapping pattern may be determined 812. A sparse depth frame from the sparse depth sensor 814 may be determined, and a mapping and fusion 816 may be performed to yield an absolute depth estimate 818.

The sparse depth map, derived from data from the sparse depth sensor, guides the relative depth map to generate a scale-adjusted relative mapping pattern. The scale-adjusted relative depth map is then fused together with the relative depth map to generate an absolute depth map.

The image depth may be provided by a relative depth module. The sparse depth module may be used to in-paint the undetectable regions such as occlusions and out-of-view regions of the sparse depth sensor, the sparse depth sensor information provides structural correction to the predicted relative depth map. The sparse depth sensor information acts to anchor the reference displacement and scale to allow the absolute depth map to be completed.

This example method divides the prediction process into two subtasks, which may be trained and evaluated separately. Training datasets with relative depth ground-truth may be used in training and to provide generalization. The proposed solution is a deep learning network utilizing as inputs an image frame and a sparse depth frame to estimate depth. The sparse depth frame having a low resolution sparse depth frame having noise, occlusions and a narrow field of view.

Figure 9:
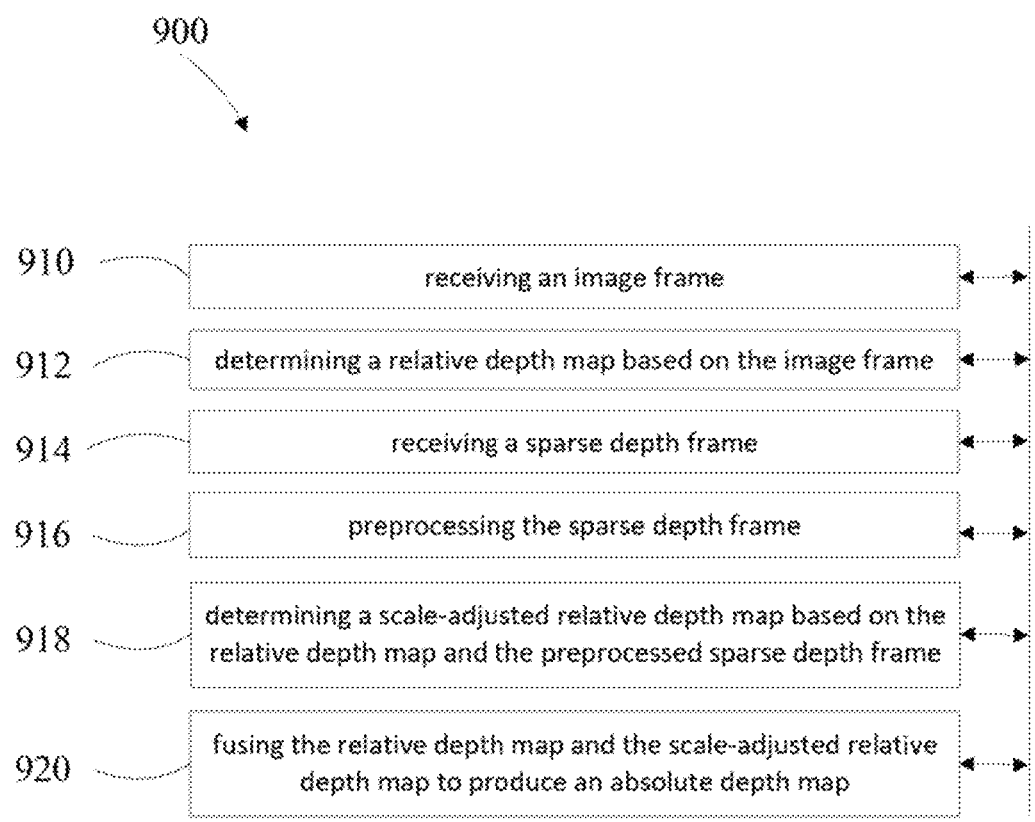
FIG. 9 is an example of method of depth estimation in accordance with one embodiment of the disclosure.

FIG. 9 depicts an example method of depth estimation, including, receiving 910 an image frame and determining 912 a relative depth map based on the image frame. The method also includes receiving 914 a sparse depth frame, preprocessing 916 the sparse depth frame, determining 918 a scale-adjusted relative depth map based on the relative depth map and the preprocessed sparse depth frame and fusing 920 the relative depth map and the scale-adjusted relative depth map to produce an absolute depth map. The preprocessed sparse depth frame may be utilized to determine a sparse depth map which may be utilized to determine the scale-adjusted relative depth map, which may be utilized to determine the absolute depth map.

The method may further include extending a field of view of the sparse depth frame and or enhancing a resolution of the sparse depth frame. The sparse depth frame may be based on at least one of time-of-flight, light detection and ranging and structured light. The determining of the relative depth map and the absolute depth map may be determined utilizing an encoder and decoder. The fusing may be performed by a fusion network. The preprocessing may include at least one of noise reduction, hole reduction, median filtering and occlusion reduction and the image frame may be based on a digital image.

Figure 10:
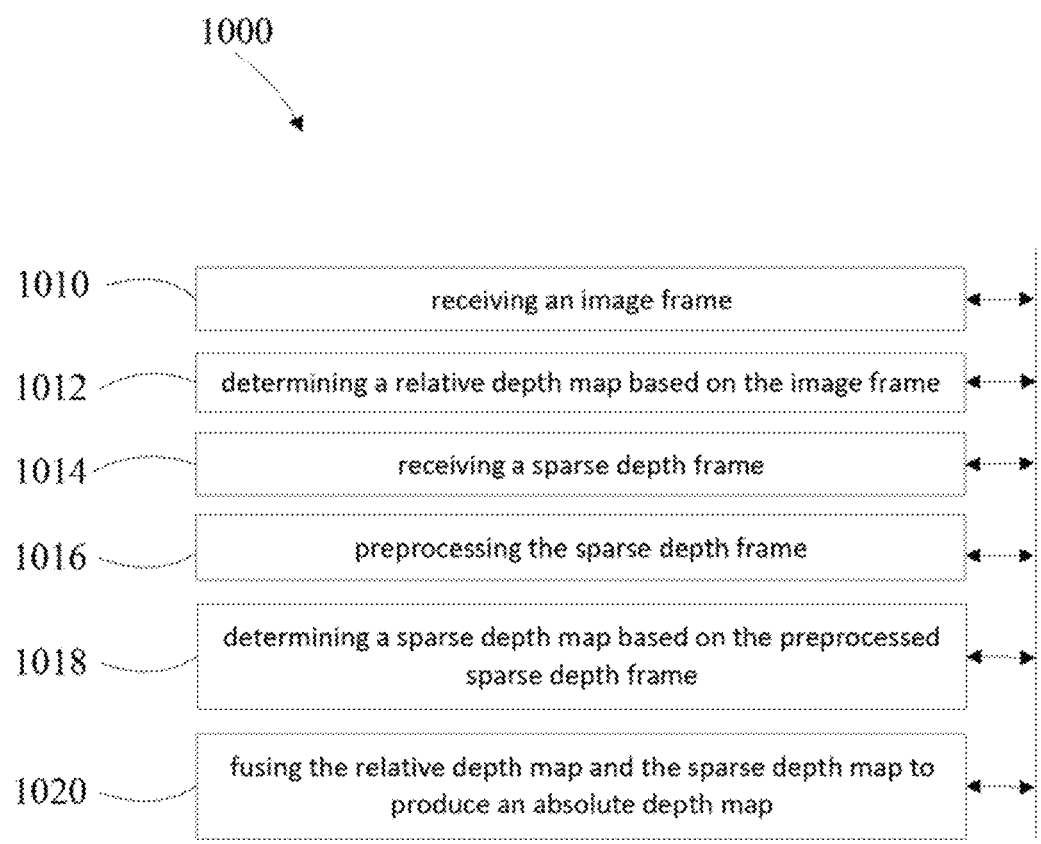
FIG. 10 is another example of method of depth estimation in accordance with one embodiment of the disclosure.

FIG. 10 depicts another example method of depth estimation including, receiving 1010 an image frame and determining 1012 a relative depth map based on the image frame. The method further includes receiving 1014 a sparse depth frame, preprocessing 1016 the sparse depth frame, determining 1018 a sparse depth map based on the preprocessed sparse depth frame and fusing 1020 the relative depth map and the sparse depth map to produce an absolute depth map.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of depth estimation, comprising:
   receiving an image frame;
   determining a relative depth map based on the image frame;
   receiving a sparse depth frame from a sparse depth sensor;
   preprocessing the sparse depth frame wherein the preprocessing includes at least one of noise reduction, hole reduction, median filtering, and occlusion reduction;
   after preprocessing, extending a field of view of the sparse depth frame to the field of view of the image frame, reducing noise in the sparse depth frame, and enhancing resolution of the sparse depth frame, resulting in a sparse depth map;
   determining a scale-adjusted relative depth map based on the relative depth map and the sparse depth map; and
   fusing the relative depth map and the scale-adjusted relative depth map to produce an absolute depth map.

2. The method of depth estimation of claim 1, wherein the sparse depth frame is based on at least one of time-of-flight, light detection and ranging and structured light.

3. The method of depth estimation of claim 1, wherein the determining of the relative depth map is determined utilizing an encoder and decoder.

4. The method of depth estimation of claim 1, wherein the determining of the absolute depth map is determined utilizing an encoder and decoder.

5. The method of depth estimation of claim 1, wherein the fusing is performed by a fusion network.

6. A method of depth estimation, comprising:
  receiving an image frame;
  determining a relative depth map based on the image frame;
  receiving a sparse depth frame from a sparse depth sensor;
  preprocessing the sparse depth frame wherein the preprocessing includes at least one of noise reduction, hole reduction, median filtering, and occlusion reduction;
  after preprocessing, extending a field of view of the sparse depth frame to the field of view of the image frame, reducing noise in the sparse depth frame, and enhancing resolution of the sparse depth frame, resulting in a sparse depth map;
  and
  fusing the relative depth map and the sparse depth map to produce an absolute depth map.

7. The method of depth estimation of claim 6, further comprising extending a field of view of the sparse depth frame.

8. The method of depth estimation of claim 6, further comprising enhancing a resolution of the sparse depth frame.

9. The method of depth estimation of claim 6, wherein the sparse depth frame is based on at least one of time-of-flight, light detection and ranging and structured light.

10. The method of depth estimation of claim 6, wherein the preprocessing includes at least one of a noise reduction, a hole reduction, a median filtering and an occlusion reduction.

* * * * *